US011631190B2

United States Patent
Yim et al.

(10) Patent No.: US 11,631,190 B2
(45) Date of Patent: Apr. 18, 2023

(54) ELECTRONIC DEVICE AND METHOD FOR CONTROLLING AUTO FOCUSING THEREOF

(71) Applicant: Samsung Electronics Co., Ltd, Suwon-si (KR)

(72) Inventors: Sungjun Yim, Suwon-si (KR); Jaehee Park, Suwon-si (KR); Soyoung Lee, Suwon-si (KR); Seungho Lee, Suwon-si (KR); Yonggu Lee, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 16/793,709

(22) Filed: Feb. 18, 2020

(65) Prior Publication Data

US 2020/0265603 A1 Aug. 20, 2020

(30) Foreign Application Priority Data

Feb. 18, 2019 (KR) ........................ 10-2019-0018865

(51) Int. Cl.
*H04N 7/18* (2006.01)
*G06T 7/70* (2017.01)
(Continued)

(52) U.S. Cl.
CPC .................. *G06T 7/70* (2017.01); *G02B 7/28* (2013.01); *G06N 20/00* (2019.01); *G06T 7/80* (2017.01);
(Continued)

(58) Field of Classification Search
CPC .... G06T 7/70; G06T 7/80; G02B 7/28; G06N 20/00; H04N 5/23212; H04N 5/23245;
(Continued)

(56) References Cited

U.S. PATENT DOCUMENTS 5,625,848 A * 4/1997 Imanari .................... G02B 7/28
396/234
5,752,115 A * 5/1998 McIntyre ................. G02B 7/32
396/431
(Continued)

FOREIGN PATENT DOCUMENTS

CN 107071243 A 8/2017
EP 3328066 A1 5/2018
(Continued)

OTHER PUBLICATIONS

Notification of Transmittal of the International Search Report and The Written Opinion of the International Searching Authority, or the Declaration dated Jun. 12, 2020 in connection with International Patent Application No. PCT/KR2020/002262, 11 pages.
(Continued)

*Primary Examiner* — Leron Beck

(57) ABSTRACT

An electronic device includes a camera, a sensor for detecting a distance value relative to an object, a memory for storing calibration data for correcting a lens location of the camera based on the distance value detected by the sensor, and a processor. The memory stores instructions that, when executed, cause the processor to determine the lens location of the camera based on the distance value when the camera is operated, obtain lens location data for the distance value and the determined lens location, update the calibration data based on the lens location data, and determine the lens location of the camera based on the updated calibration data.

17 Claims, 18 Drawing Sheets

(51) Int. Cl.
*G06T 7/80* (2017.01)
*G06N 20/00* (2019.01)
*G02B 7/28* (2021.01)
*H04N 5/232* (2006.01)
*H04N 5/247* (2006.01)

(52) U.S. Cl.
CPC ..... *H04N 5/23212* (2013.01); *H04N 5/23245* (2013.01); *H04N 5/247* (2013.01)

(58) Field of Classification Search
CPC ................ H04N 5/247; H04N 5/2258; H04N 5/232933; H04N 17/002; H04N 5/232121; H04N 5/23258; H04N 5/23287; G03B 13/20; G03B 13/36
See application file for complete search history.

(56) References Cited

U.S. PATENT DOCUMENTS

| | | | |
|---|---|---|---|
| 7,945,151 B2 * | 5/2011 | Hirai | H04N 5/3532 250/201.7 |
| 9,275,459 B2 | 3/2016 | Goma et al. | |
| 10,104,364 B2 | 10/2018 | Goma et al. | |
| 10,261,287 B2 | 4/2019 | Tang-Jespersen et al. | |
| 10,387,477 B2 | 8/2019 | Galor Gluskin et al. | |
| 10,451,838 B2 | 10/2019 | Kim et al. | |
| 10,482,627 B2 | 11/2019 | Kim et al. | |
| 10,602,063 B2 | 3/2020 | Ho | |
| 2014/0098194 A1 | 4/2014 | Goma et al. | |
| 2014/0307126 A1 | 10/2014 | Son et al. | |
| 2014/0313396 A1 * | 10/2014 | Liang | G03B 13/36 348/345 |
| 2016/0014404 A1 * | 1/2016 | Krestyannikov | G02B 7/38 348/187 |
| 2016/0182890 A1 | 6/2016 | Goma et al. | |
| 2016/0266467 A1 * | 9/2016 | Lou | G03B 3/10 |
| 2016/0295097 A1 | 10/2016 | Shanmugadivelu et al. | |
| 2016/0301852 A1 * | 10/2016 | Krishnamurthy Sagar | G01B 11/14 |
| 2018/0082441 A1 | 3/2018 | Kim et al. | |
| 2018/0149830 A1 | 5/2018 | Kim et al. | |
| 2018/0227489 A1 | 8/2018 | Ho | |
| 2018/0349378 A1 | 12/2018 | Galor Gluskin et al. | |
| 2020/0265603 A1 * | 8/2020 | Yim | H04N 5/2258 |
| 2022/0133241 A1 * | 5/2022 | Jones | A61B 5/743 600/485 |

FOREIGN PATENT DOCUMENTS

| | | |
|---|---|---|
| JP | 2018517161 A | 6/2018 |
| KR | 10-2018-0053333 A | 5/2018 |
| WO | 2016/164167 A1 | 10/2016 |

OTHER PUBLICATIONS

Partial European Search Report dated May 4, 2020 in connection with European Patent Application No. 20 15 7614, 15 pages.

* cited by examiner

| DISTANCE VALUE | AF CODE |
|---|---|
| 500 | 200 |
| 300 | 400 |
| 1500 | 180 |
| ⋮ | ⋮ |

FIG.4

ELECTRONIC DEVICE AND METHOD FOR CONTROLLING AUTO FOCUSING THEREOF

CROSS-REFERENCE TO RELATED APPLICATION

This application is based on and claims priority under 35 U.S.C. § 119 to Korean Patent Application No. 10-2019-0018865 filed on Feb. 18, 2019 in the Korean Intellectual Property Office, the disclosure of which is incorporated by reference herein its entirety.

BACKGROUND

1. Field

The disclosure relates to a method for controlling auto focus of an electronic device including a camera.

2. Description of Related Art

Not only a digital camera but also electronic devices having a camera such as a smart phone have been widely spread. The electronic devices having the camera may perform an auto focus function that operates to focus on an object. Using the auto focus function, the electronic device may focus on the object even when there is no separate input of a user.

The above information is presented as background information only to assist with an understanding of the disclosure. No determination has been made, and no assertion is made, as to whether any of the above might be applicable as prior art with regard to the disclosure.

SUMMARY

There are several types of controlling schemes as an auto focus controlling scheme. For example, there are passive controlling schemes such as contrast AF or active controlling schemes such as laser AF. An electronic device may control an actuator to move a location of a lens disposed in a camera to perform an auto focus control function. The electronic device needs to rapidly determine and move the location of the lens to rapidly perform the auto focus control.

In addition, as a size of a camera module is miniaturized, electronic devices having a plurality of cameras with various lenses have been widely spread. When the electronic device captures an image using the plurality of cameras, the switched camera needs to be refocused when switching to another camera to capture the image while capturing the image using one camera.

The disclosure may provide an electronic device and a method for controlling auto focus of the electronic device that may perform an auto focus function accurately and rapidly. Aspects of the disclosure are to address at least the above-mentioned problems and/or disadvantages and to provide at least the advantages described below.

Accordingly, an aspect of the disclosure is to provide an electronic device including a camera, a sensor for detecting a distance value relative to an object, a memory for storing calibration data for correcting a lens location of the camera based on the distance value detected by the sensor, and a processor, wherein the memory stores instructions that, when executed, cause the processor to determine the lens location of the camera based on the distance value when the camera is operated, obtain lens location data for the distance value and the determined lens location, update the calibration data based on the lens location data, and determine the lens location of the camera based on the updated calibration data.

Accordingly, another aspect of the disclosure is to provide an electronic device including a first camera, a second camera, a memory for storing lens location conversion data mapping first lens location data for the first camera with second lens location data for the second camera, and a processor, wherein the memory stores instructions that, when executed, cause the processor to obtain the first lens location data for the first camera when the first camera is operated, obtain the second lens location data for the second camera in response to a first camera switching command for switching a selected camera from the first camera to the second camera, update the lens location conversion data based on the first lens location data and the second lens location data, and determine a lens location of the second camera based on the updated lens location conversion data in response to a second camera switching command for switching the selected camera from the first camera to the second camera.

Accordingly, another aspect of the disclosure is to provide a method for determining a lens location by an electronic device having a camera including obtaining a distance value using a sensor, determining a lens location based on the distance value when the camera is operated, updating calibration data based on lens location data including information about the distance value and the determined lens location, and determining the lens location of the camera based on the updated calibration data.

Accordingly, another aspect of the disclosure is to provide a method for determining a lens location by an electronic device having a first camera and a second camera including obtaining first lens location data for the first camera when the first camera is operated, obtaining second lens location data for the second camera in response to a first camera switching command for switching a selected camera from the first camera to the second camera, updating lens location conversion data mapping a first lens location for the first camera and a second lens location for the second camera with each other based on the first lens location data and the second lens location data, and determining a lens location of the second camera based on the updated lens location conversion data in response to a second camera switching command for switching the selected camera from the first camera to the second camera.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a diagram illustrating a concept of calibration data according to an embodiment;

In the description of the drawings, the same or similar reference numerals may be used for the same or similar components.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
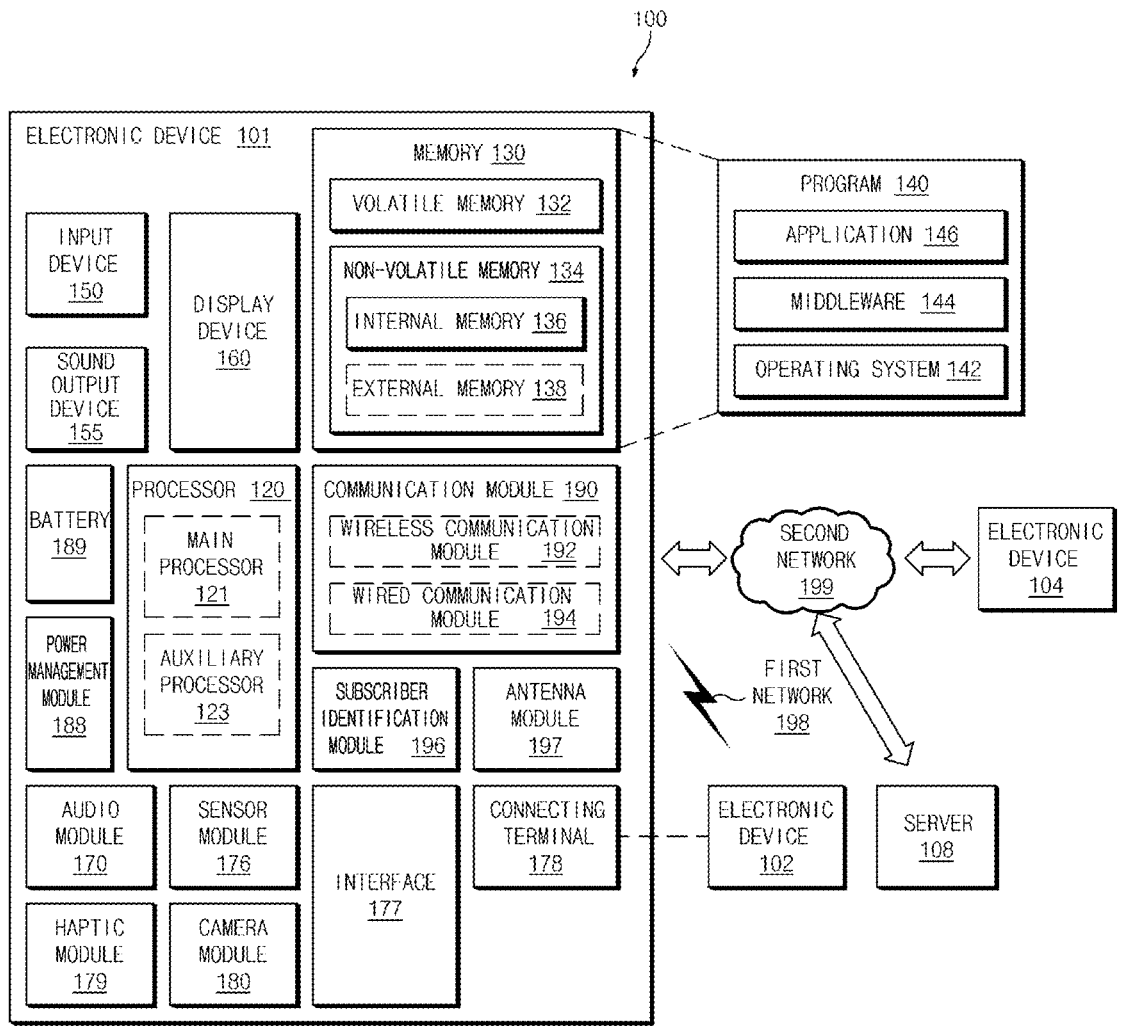
FIG. 1 illustrates a block diagram of an electronic device in a network environment according to various embodiments.

FIG. 1 is a block diagram of an electronic device 101 in a network environment 100 according to various embodiments. Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device 104 through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the external electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
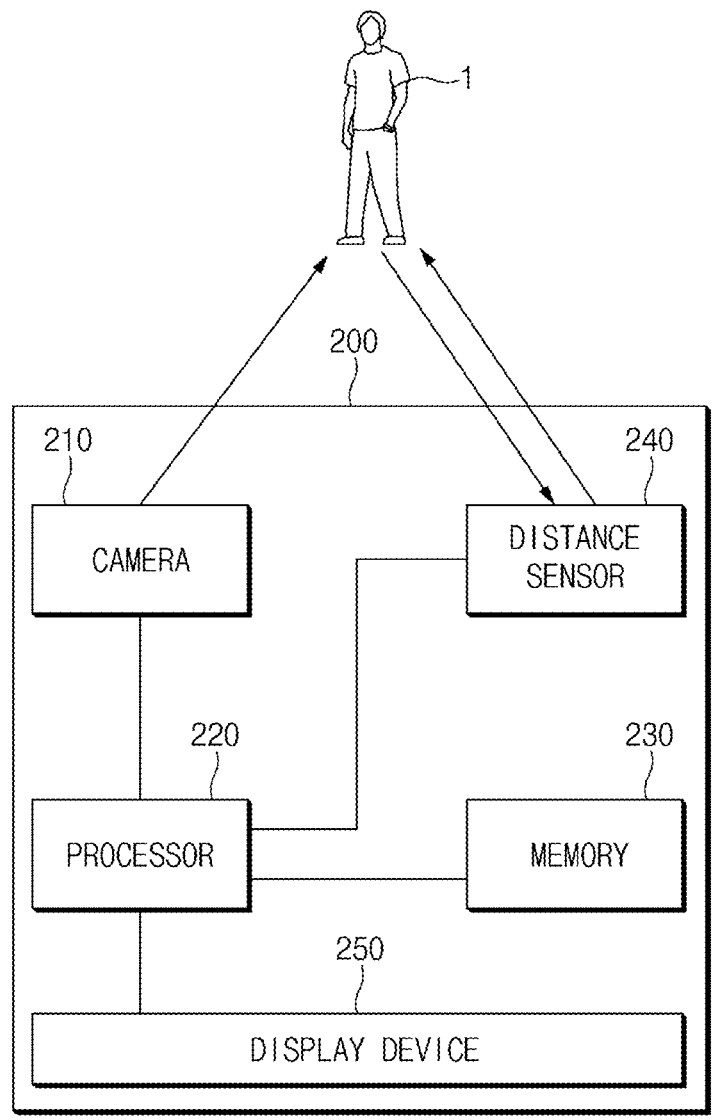
FIG. 2 is a block diagram illustrating a structure of an electronic device according to an embodiment.

FIG. 2 is a block diagram illustrating a structure of an electronic device 200 according to an embodiment.

According to an embodiment, an electronic device 200 may include at least one of a camera 210, a processor 220, a memory 230, and a sensor 240. The memory 230 according to an embodiment may store a program including instructions for allowing the electronic device 200 to operate. The processor 220 may control components of the electronic device 200 or process data by executing instructions stored in the memory 230. In an embodiment to be described below, an operation performed by the processor 220 or the electronic device 200 may be performed when the processor 220 executes the instructions stored in the memory 230.

According to an embodiment, the sensor (or a distance sensor) 240 may provide the processor 220 with information about a distance value for a subject 1 under control of the processor 220. The sensor 240 may include a sensor that may detect a distance to the subject 1. For example, the sensor 240 may include a time-of-flight (TOF) module. The TOF module may include an illumination source that emits radiation having a wavelength or a range of wavelengths and an optical receiver that may operate to detect the wavelength or the range of the wavelengths thereof. A time-of-flight may be determined by measuring a time until a light pulse reaches the optical receiver after being emitted and reflected by the subject 1. However, the disclosure is not limited thereto, and the sensor 240 may be formed according to another embodiment.

The processor 220 may determine a location of a lens of the camera 210 based on the distance value for the subject 1. The processor 220 may use the distance value and/or calibration data stored in the memory 230 to determine the location of the lens of the camera 210. According to an embodiment, the processor 220 may search for the lens location matching the distance value from the calibration data formed in a look-up table. According to an embodiment, the processor 220 may determine a function defining a relationship between the distance value and the lens location from the calibration data, and input the distance value into the determined function to receive the lens location back. According to an embodiment, the calibration data may be the function defining the relationship between the distance value and the lens location. According to an embodiment, the lens location may be formed in a form of a code value for controlling an actuator that moves the lens.

According to an embodiment, the processor 220 may update the calibration data based on a result of performing focus detection. However, because it is difficult to determine a correct focus by only a performance of an image processor in a low light level environment or in a situation where characteristics of a camera sensor are not good, the processor 220 may not update the calibration data in the low light level environment in which a light level value obtained during the operation of the camera is lower than a specified value or in the situation where the characteristics of the camera sensor are not good. In an environment in which the image processor is difficult to focus, the focus may be adjusted effectively and accurately using distance measurement information (e.g., a value measured using the TOF module).

The processor 220 may control the camera 210 based on the determined lens location. According to an embodiment, the processor 220 may transmit a control signal corresponding to a determined lens code to an actuator of the camera 210. For example, the processor 220 may set the determined lens location as an initial location of the lens for the camera 210 to automatically focus. The camera 210 may generate image data capturing the subject 1.

According to an embodiment, the electronic device 200 may further include a display device 250. The display device 250 may include, for example, a display capable of outputting a screen, such as a liquid crystal display (LCD), an organic light emitting diode panel, and the like. The display device 250 may output a user interface for outputting an image captured by the camera 210 in a live view or for interacting with the user under control of the processor 220.

Figure 3:
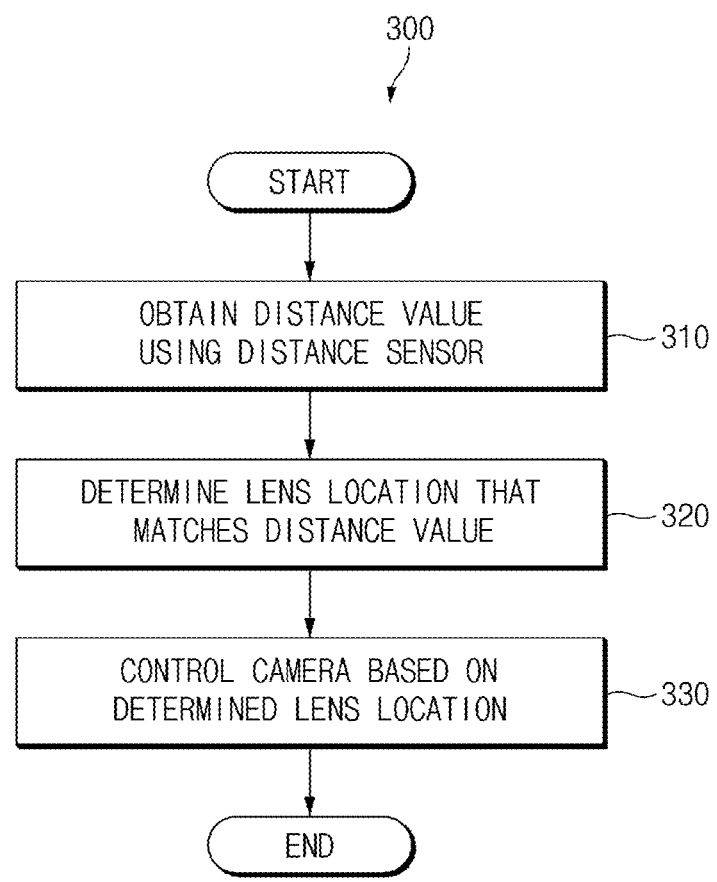
FIG. 3 is a flowchart illustrating a process, by an electronic device, of focusing on a subject, according to an embodiment.

FIG. 3 is a flowchart 300 illustrating a process, by an electronic device, of focusing on a subject, according to an embodiment. FIG. 3 will be described with reference to the reference numerals shown in FIG. 2.

In operation 310, the processor 220 may obtain a distance value using the sensor 240. For example, the processor 220 may obtain a value corresponding to a distance such as 500 mm or 300 mm.

In operation 320, the processor 220 may determine a lens location that matches the obtained distance value. According to an embodiment, the processor 220 may determine the lens location that matches the distance value using the calibration data stored in the memory 230.

In operation 330, the processor 220 may control the camera 210 such that the lens of the camera 210 moves to a location corresponding to the determined lens location based on the determined lens location.

FIG. 4 is a diagram illustrating a concept of calibration data 400 according to an embodiment.

The calibration data 400 according to an embodiment may include information 410 about a distance (e.g., a distance value) and information 420 about a lens location (e.g., an AF code).

Referring to FIG. 4, the distance value 410 and the AF code 420 included in the calibration data 400 may be mapped to each other and stored in the memory 230 in a state of being linked with each other.

Figure 5:
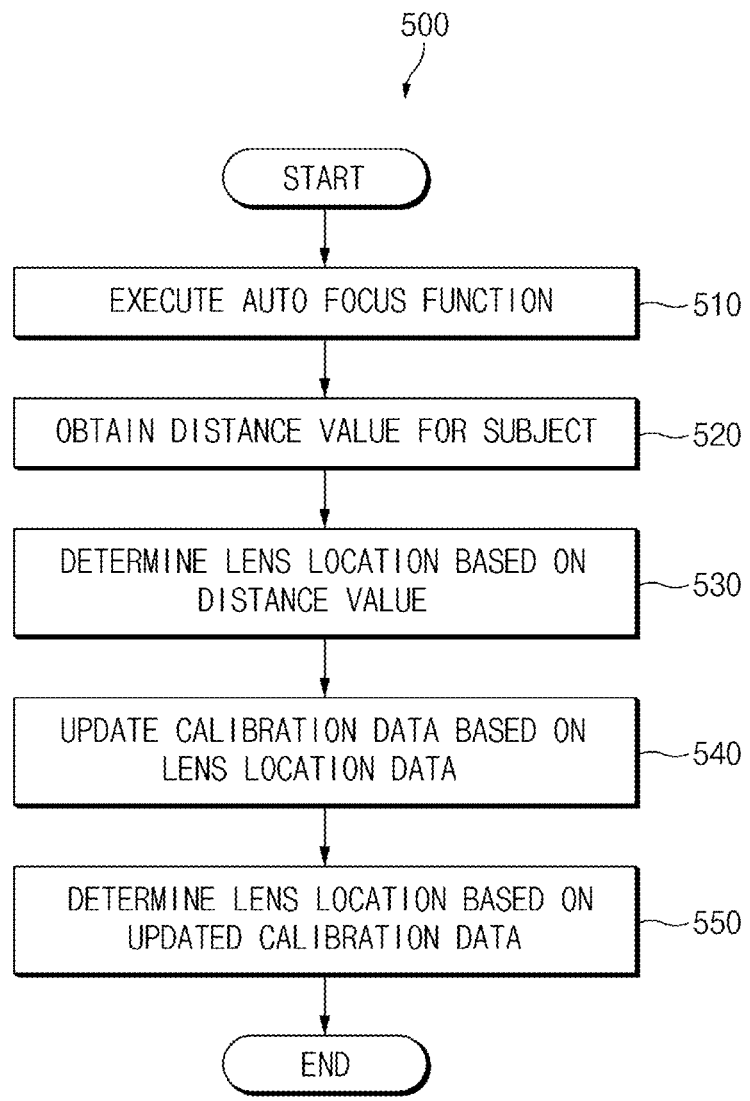
FIG. 5 is a flowchart illustrating a process, by an electronic device, of determining a lens location based on calibration data, according to an embodiment.

FIG. 5 is a flowchart 500 illustrating a process, by an electronic device, of determining a lens location based on calibration data, according to an embodiment.

In operation 510, the processor 220 of the electronic device 200 may execute an auto focus function when the camera 210 operates. For example, when a camera application installed on the electronic device 200 is executed, the processor 220 may control the camera 210 such that an image focuses on the subject 1 while outputting the image obtained through the camera 210 in the live-view through the display device 250.

When the auto focus function is executed, in operation 520, the processor 220 may obtain a distance value for the subject 10 through the sensor 240. For example, when the sensor 240 includes the TOF module, radiation having a wavelength may be emitted and then a wavelength of the radiation reflected on the subject 1 may be detected to obtain a distance value corresponding to a time-of-flight of the wavelength of the corresponding radiation.

In operation 530, the processor 220 may determine a lens location based on the distance value. According to an embodiment, the processor 220 may use calibration data (e.g., the calibration data 400 of FIG. 4) stored in the memory 230 to determine the lens location. For example, the processor 220 may obtain an AF code (e.g., the AF code 420 of FIG. 4) indicating the location of the lens of the camera 210 corresponding to a distance value (e.g., the distance value 410 of FIG. 4) from the calibration data. The processor 220 may transmit a control signal corresponding to the obtained AF code to the camera 210, so that the lens of the camera 210 may be located at a location for finding a focus. The processor 220 may analyze the image captured by the camera 210 to determine the location of the lens that allows the focus to be located on the subject while moving the location of the lens of the camera 210.

According to an embodiment, the calibration data may be set in the electronic device 200 based on characteristics of the electronic device 200 at a time of manufacture of the electronic device 200. However, when an impact is applied on the electronic device 200 or when an environment such as temperature is different from that at the time of the manufacture, initially set calibration data may be less accurate. Thus, calibration data may be needed to find correct location of the lens even in the environment different from that at the time of the initial manufacture.

The processor 220 may obtain lens location data including information about the distance value for the subject and the lens location focused on the subject as a result of executing the auto focus function. The processor 220 may collect the lens location data obtained as the result of executing the auto focus function. In operation 540, the processor 220 may update the calibration data stored in the memory 230 based on the lens location data. According to an embodiment, the updating of the calibration data may mean merging the calibration data with the collected lens location data. According to an embodiment, a scheme for fitting the camera 210 using data corrected for each distance and a scheme for fitting the camera 210 using the collected data may be mixed with each other and used.

In operation 550, the processor 220 may determine the lens location based on the updated calibration data when the camera 210 is operated to execute the auto focus function.

Figure 6:
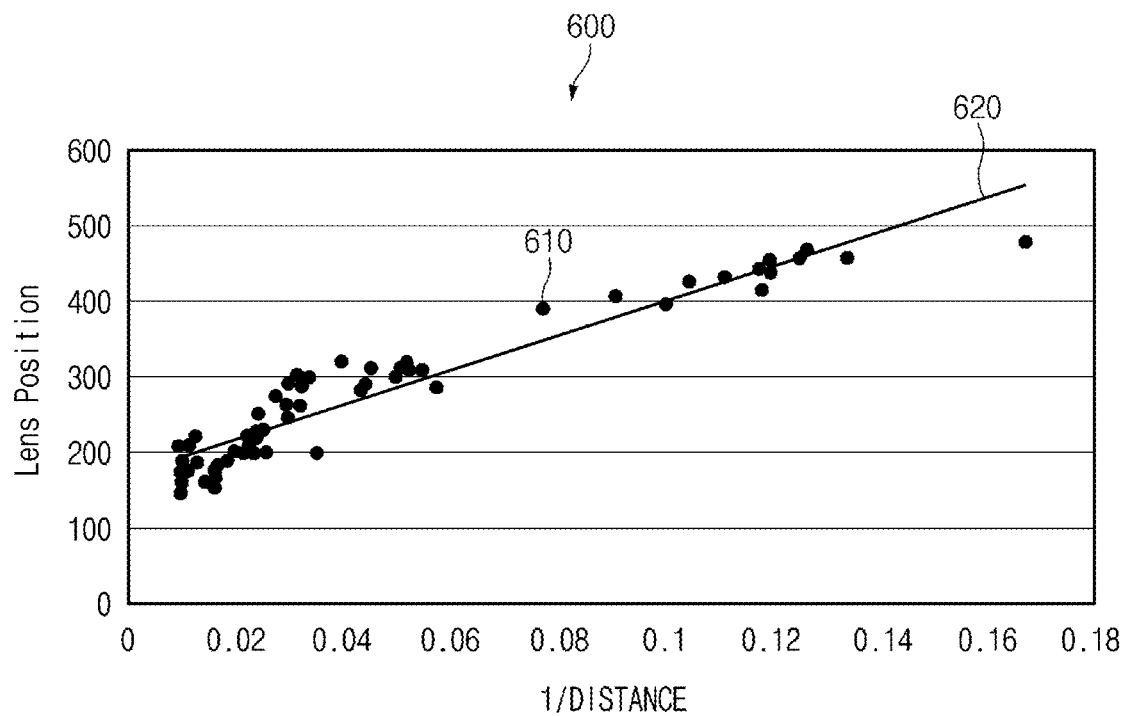
FIG. 6 illustrates a graph for describing an example of collected lens location data.

FIG. 6 illustrates a graph 600 for describing an example of collected lens location data.

The electronic device 200 according to an embodiment may collect lens location data 610 formed of a pair of the location of the lens and the distance value, while executing the auto focus function. According to an embodiment, the electronic device 200 may define a function indicating a relationship 620 between the location of the lens and the distance to the subject based on the collected lens location data 610. For example, the electronic device 200 may determine the location of the lens for the detected distance value using the function defined based on the lens location data 610. For example, the electronic device 200 may determine the location of the lens relative to the distance value using the collected lens location data 610. For example, when the function is defined in a form of y=2300.7x+171.16 based on the collected lens location data, the electronic device 200 may obtain a lens location of a 186.498 code to focus on a subject whose detected distance is 150 cm. In the above example, the function is presented in a form of a primary polynomial, but the function may be defined in other forms. Considering a complexity of calculation and an accuracy of the function together, the function may be defined in a form of a cubic polynomial.

In the disclosure, the updating of the calibration data based on the collected lens location data or the determining of the relationship between the location of the lens and the distance value based on the collected lens location data may be referred to as learning of the lens location data.

Figure 7:
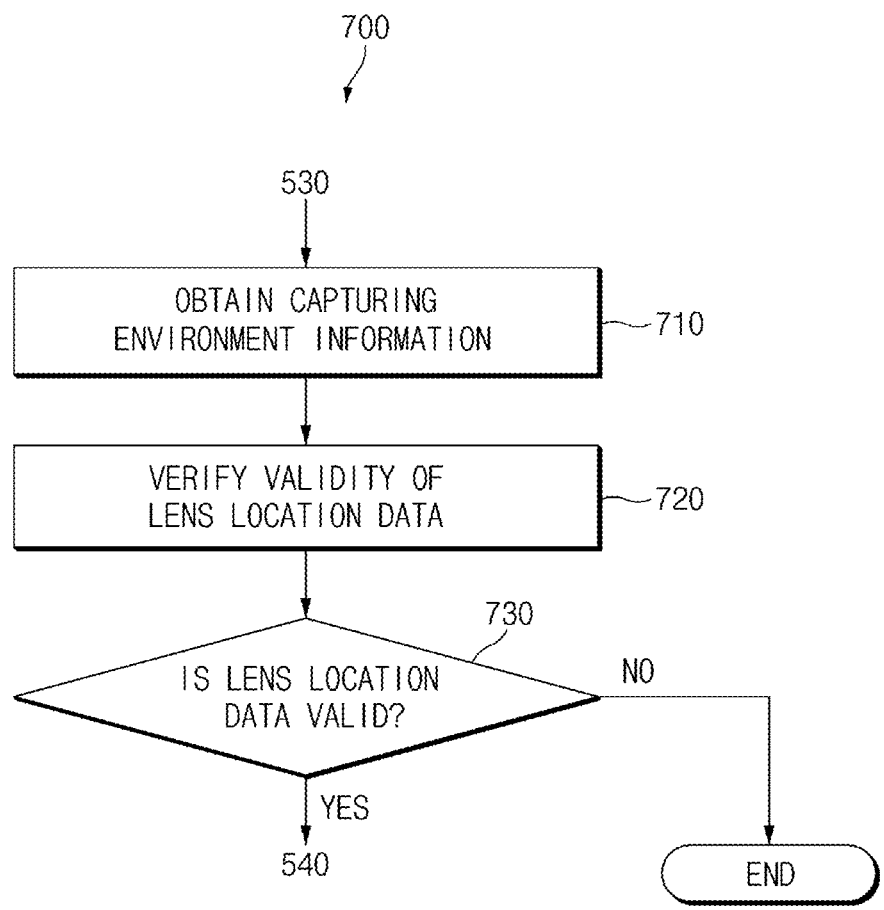
FIG. 7 is a diagram illustrating a process of identifying lens location data according to an embodiment.

FIG. 7 is a diagram illustrating a process of identifying lens location data according to an embodiment.

When the electronic device 200 learns results of performing the auto focus, not all the results of performing the auto focus function may be focused on the subject favorably. Therefore, the accuracy may be lowered when performing the auto focus function by learning poor results of performing the auto focus function. Thus, according to an embodiment, the electronic device 200 may identify a validity of the obtained lens location data, and the electronic device 200 may be allowed to learn the lens location data when the lens location data is valid as the verification result.

According to an embodiment, the processor 220 may obtain the lens location data in operation 530 of FIG. 5, and may obtain capturing environment information associated with the obtained lens location data in operation 710. The capturing environment information may mean information about an environment associated with image capturing when capturing the image using the auto focus function. For example, the capturing environment information may include motion information about a motion of the electronic device, filter value information such as a contrast filter value, brightness value information, signal to noise ratio information, and information about a disparity of the image or a BV value.

In an embodiment, in operation 710, the processor 220 may obtain the capturing environment information through the sensor of the electronic device 200. For example, the processor 220 may obtain a value detected through a sensor capable of detecting a motion, such as a gyro sensor, an acceleration sensor, or a gravity sensor as the capturing environment information. As another example, the processor 220 may obtain a temperature value as the capturing environment information using a temperature sensor.

In an embodiment, the processor 220 may obtain the capturing environment information from the image obtained through the camera 210 in operation 610. For example, the processor 220 may calculate a brightness value, a signal to noise ratio, or a disparity of the image as the capturing environment information from the image captured through the camera 210.

In operation 720, the processor 220 may identify the validity of the lens location data based on the obtained capturing environment information. According to an embodiment, when the capturing environment information satisfies a specified environment condition, the processor 220 may determine that the lens location data is valid. A case in which the capturing environment information satisfies the specified environment condition may mean a case in which a value included in the capturing environment information is included in a range included in the specified environment condition, for example. For example, when the signal to noise ratio included in the capturing environment information is less than 1000, the processor 220 may determine that the lens location data is invalid.

In operation 730, when it is determined that the lens location data is valid, the processor 220 may learn the lens location data. According to an embodiment, when it is determined that the lens location data is valid, the processor 220 may perform operation 540 of FIG. 5.

According to an embodiment, the electronic device 200 may renew the specified environment condition based on the result of performing the auto focus function. For example, when an image that is well focused on the subject using the auto focus function is obtained, the electronic device 200 may obtain capturing environment information associated with a time when the image was obtained, and renew the environment condition to determine that the lens location data obtained from the corresponding capturing environment information is valid.

Figure 8:
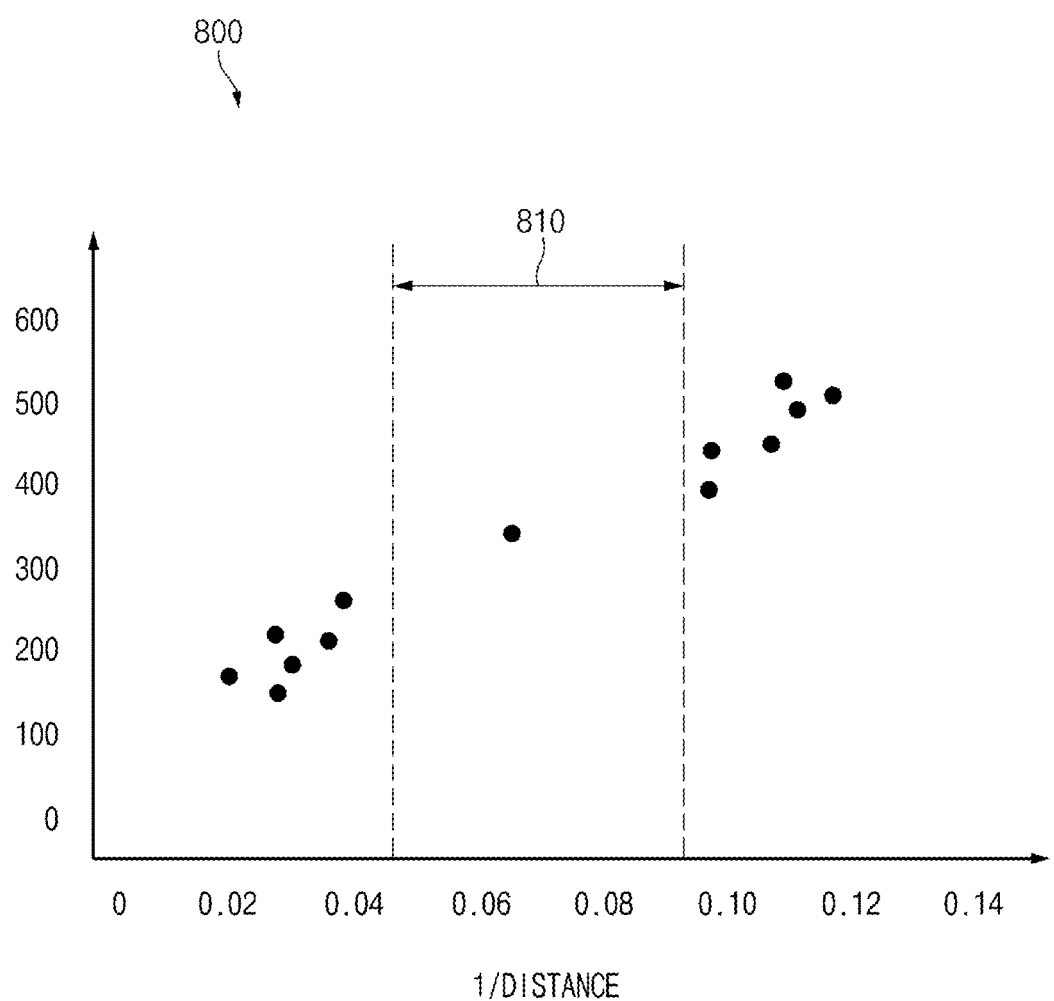
FIG. 8 illustrates a graph for describing a method for obtaining new lens location data based on a distribution chart of lens location data collected by an electronic device according to an embodiment.

FIG. 8 illustrates a graph 800 for describing a method for obtaining new lens location data based on a distribution chart of lens location data collected by an electronic device according to an embodiment.

According to an embodiment, the electronic device 200 may prevent an amount of data from being concentrated for some distance sections based on the distribution chart of the lens location data. For example, when there is the lens location data collected as in the graph 800 of FIG. 8, the electronic device 200 may select the lens location data to be used for learning to be evenly distributed for each distance section.

As an example, lens location data included in a region 810 of a 1/distance between 0.05 and 0.09 in which a density of the lens location data is low may be collected more. For example, when the lens location data is obtained, the processor 220 may use the lens location data for the learning when the distance value corresponding to the obtained lens location data is included in the region 810 where the density of the data is lower than a specified value in the distribution graph 800. As an example, when the distance value corresponding to the obtained lens location data is included in the region 810 where the density of the data is lower than the specified value in the distribution graph 800, the environment condition for determining the validity of the lens location data may be relaxed.

According to an embodiment, the electronic device 200 may learn the lens location data when a user input corresponding to a learning command of the user is received, instead of learning the lens location data each time the lens location data is obtained. The obtained lens location data may be accumulated and stored in the memory 230 separately from the calibration data. The accumulated and stored lens location data may be referred to as learning data.

Figure 9:
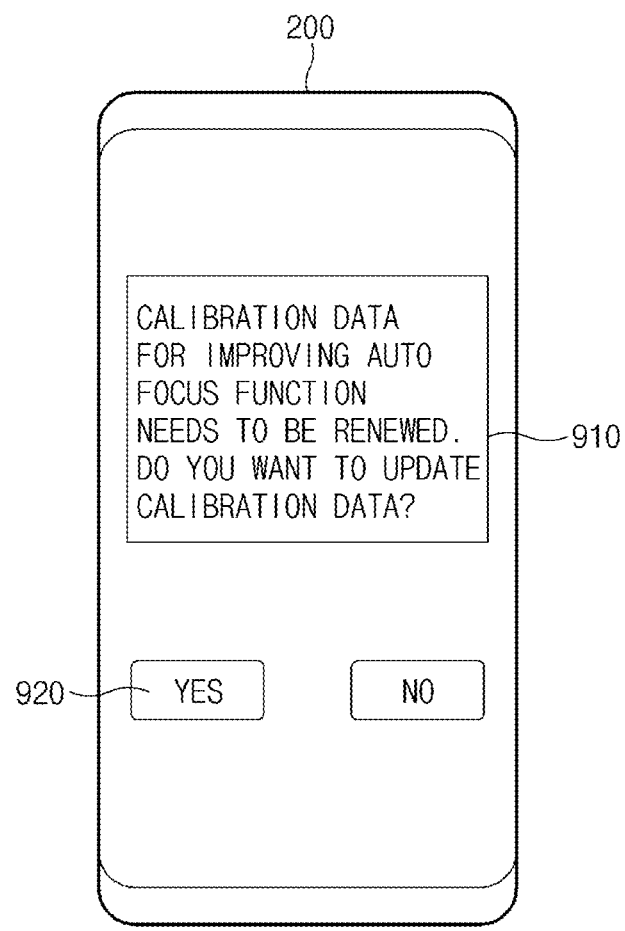
FIG. 9 illustrates an example of a user interface for determining whether to execute an update according to an embodiment.

A method for receiving the learning command of the user may be implemented by various embodiments. For example, when an item corresponding to the learning of the lens location data of menu items related to a camera setting is selected, the electronic device 200 may learn the lens location data included in the learning data. For an example, the electronic device 200 may perform the auto focus function and then evaluate and score one or more results of performing the auto focus function. When the scored evaluation result is below or equal to a specified value, the electronic device 200 may output a user interface including a message 910 as shown in FIG. 9. When a button 920 included in the user interface is selected, the electronic device 200 may learn the lens location data included in the learning data. Alternatively, when the scored evaluation result is below or equal to the specified value, the electronic device 200 may learn the lens location data without a separate input.

Figure 10:
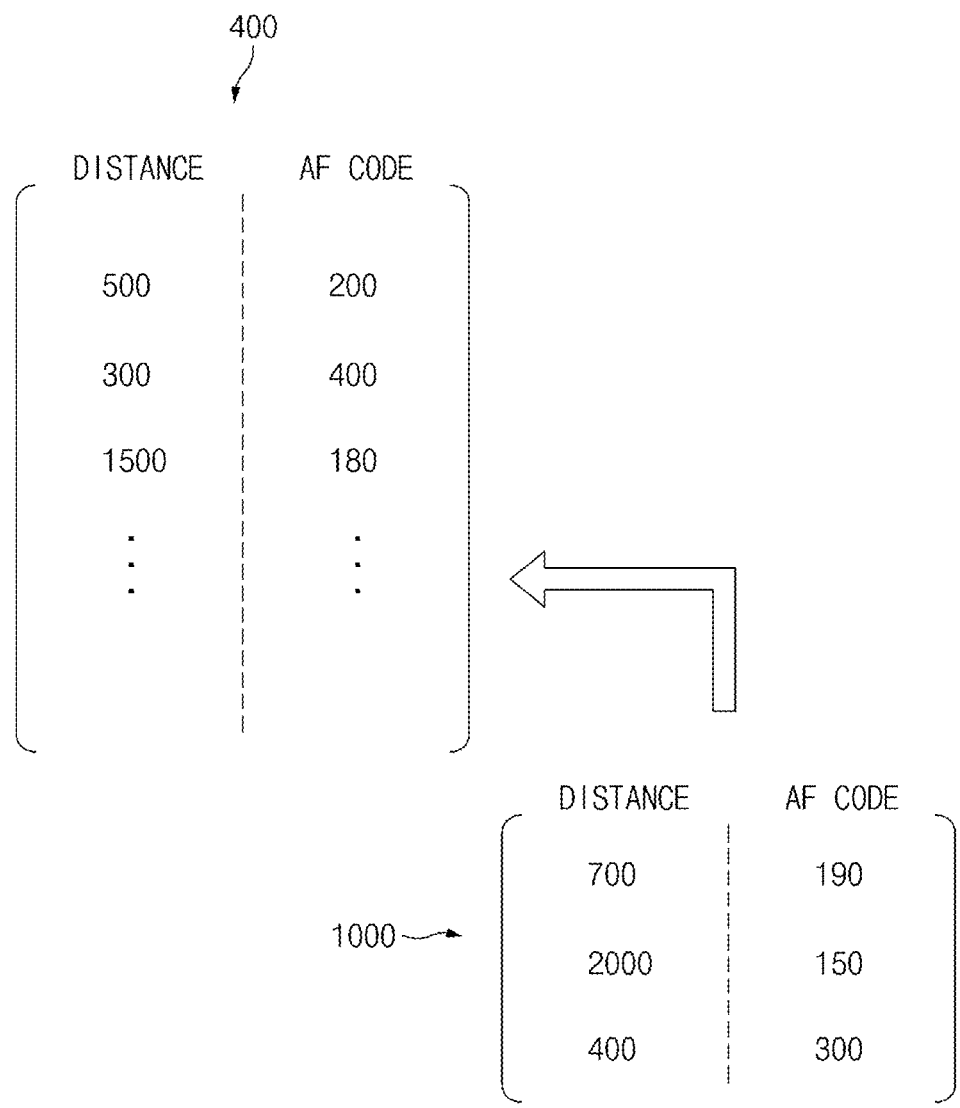
FIG. 10 illustrates a diagram for describing a method for updating calibration data using learning data by an electronic device according to an embodiment.

FIG. 10 illustrates a diagram for describing a method for updating the calibration data 400 using learning data 1000 by the electronic device 200 according to an embodiment.

When the lens location data is obtained as the result of performing the auto focus function, the electronic device 200 according to an embodiment may accumulate and store the lens location data as the learning data 1000 separate from the calibration data 400.

Thereafter, when the learning command for the lens location data is received from the user or when a condition for initiating the learning is satisfied, the electronic device 200 may update the calibration data 400 by merging the calibration data 400 and the learning data 1000 with each other. After updating the calibration data 400, the electronic device 200 may delete the learning data 1000 from the memory 230.

Figure 11:
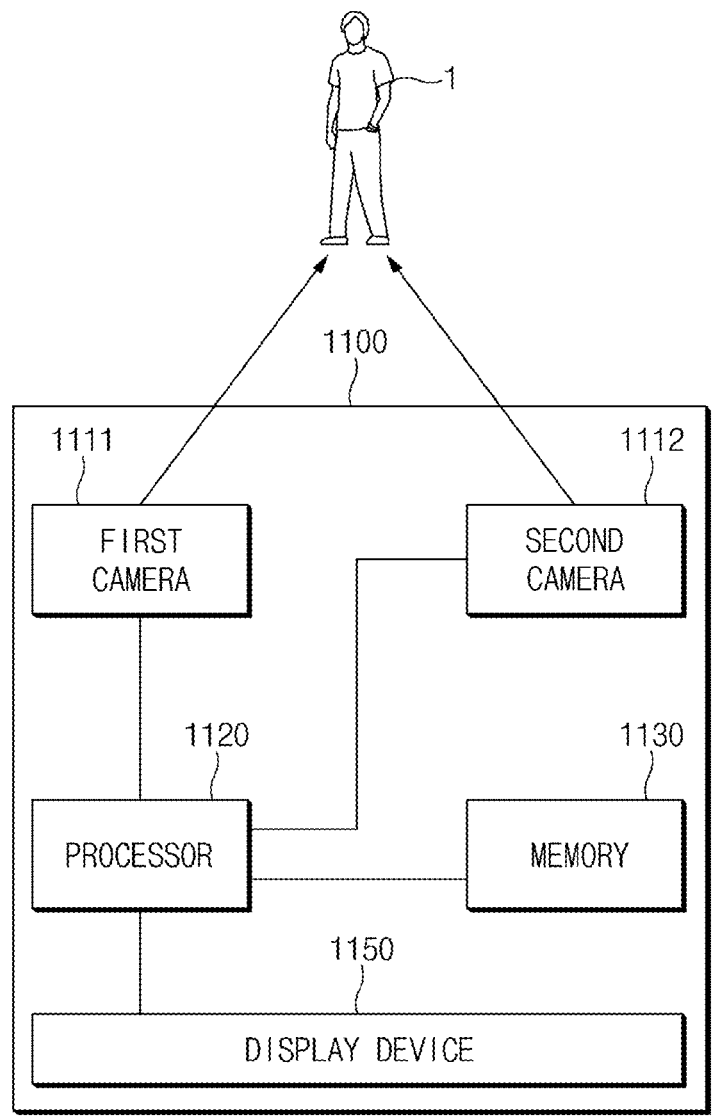
FIG. 11 is a block diagram illustrating a structure of an electronic device according to an embodiment.
Figure 12:
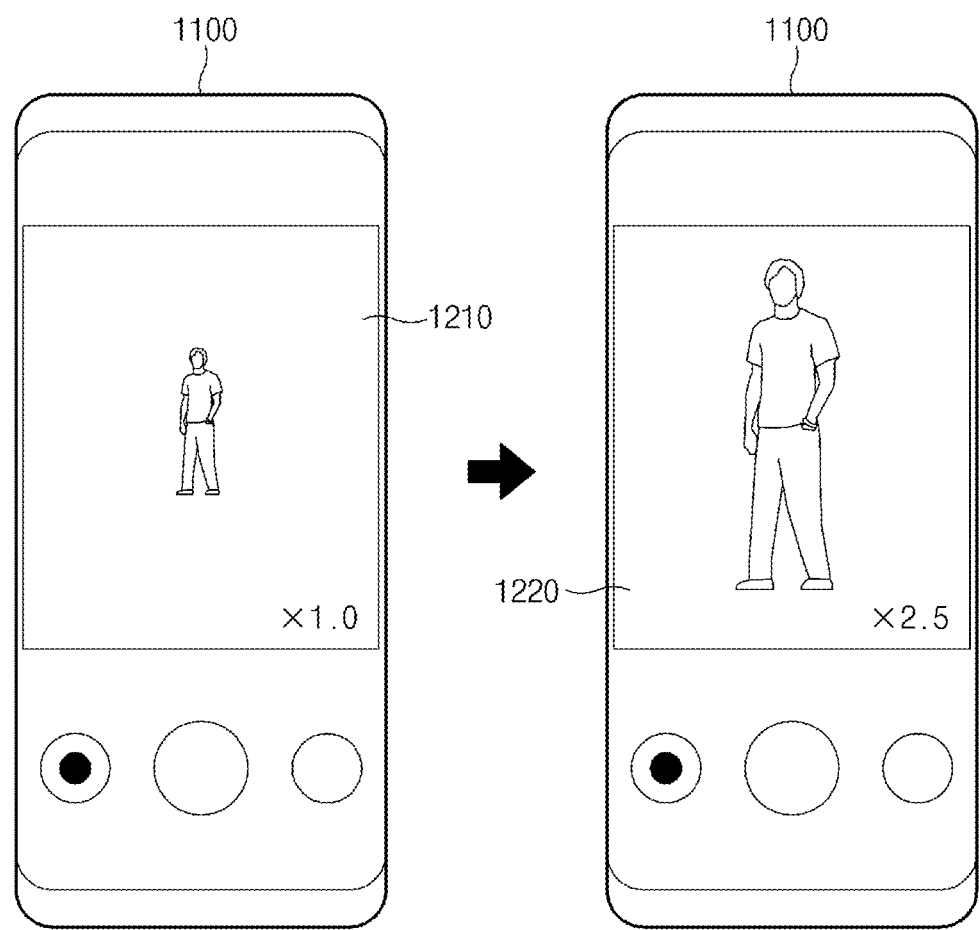
FIG. 12 is a diagram for describing an example of a camera switching command.

FIG. 11 is a block diagram illustrating a structure of an electronic device 1100 according to an embodiment.

The electronic device 1100 according to an embodiment may include at least one of a first camera 1111, a second camera 1112, a processor 1120, and a memory 1130. The memory 1130 according to an embodiment may store a program including instructions for operating the electronic device 1100. The processor 1120 may execute the instructions stored in the memory 1130 to control components of the electronic device 1100 or process data. In the disclosure, an operation referred to as being performed by the processor 1120 or the electronic device 1100 may be implemented as being performed when the processor 1120 executes the instructions stored in the memory 1130.

According to an embodiment, the electronic device 1100 may capture the subject 1 using at least one of the first camera 1111 or the second camera 1112. The processor 1120 may control at least one of the first camera 1111 or the second camera 1112 to focus at least one of the first camera 1111 and the second camera 1112 on the subject 1. For example, the processor 1120 may use a sensor (not shown) to obtain information about a distance value for the subject 1 to detect a distance from at least one of the first camera 1111 and the second camera 1112 to the subject 1. The sensor (not shown) according to the present embodiment may be formed according to various embodiments, like the sensor 240 of FIG. 2.

According to an embodiment, the processor 1120 may execute a camera application for capturing the subject 1 using at least one of the first camera 1111 and the second camera 1112. According to an embodiment, the camera application may be stored in the memory 1130. When the camera application is executed, the processor 1120 may output the image obtained from one of the first camera 1111 and the second camera 1112 through a display device 1150 as a live-view.

According to an embodiment, the processor 1120 may select one of the first camera 1111 and the second camera 1112. In a following description, when it is described that one of the first camera 1111 and the second camera 1112 is selected, it may be interpreted that the reverse may be available. When outputting an image obtained from the first camera 1111 through the display device 1150 as the live-view, the processor 1120 may control the camera obtaining the image to focus on the subject 1. As an example, when receiving an image capturing command in a state of outputting the image obtained from the first camera 1111 through the display device 1150, the electronic device 1100 may store the image being output in the memory 1130 as a file. The image capturing command may be input through an input device (e.g., the input device 150 of FIG. 1) disposed in the electronic device 1100.

According to an embodiment, a camera switching command may be input to the electronic device 1100 in the state in which the processor 1120 is outputting the image obtained from the first camera 1111 through the display device 1150 as the live-view. In response to the camera switching command, the processor 1120 may output an image obtained from the second camera 1112 through the display device 1150 as a live-view instead of the image obtained from the first camera 1111.

The camera switching command may refer to a command for switching a camera selected for image capturing among cameras provided in the electronic device 1100 to another camera. The camera switching command may be implemented variously according to embodiments. For example, referring to FIG. 12, the electronic device 1100 may output a live-view image 1210 as an image obtained using a camera having a wide angle lens while capturing an image at a magnification of 1. In this connection, when a zoom-in command is input, the electronic device 1100 may increase the magnification of the image being captured. When the magnification of the image increases equal to or above a specified value, the electronic device 1100 may output a live-view image 1220 as an image obtained using a camera having a narrow angle lens. For example, a command for increasing the magnification of the image to be equal to or above the specified value may be the camera switching command. As an example, the camera switching command may be implemented in other forms. For example, the electronic device 1100 may output a list of cameras (e.g., the first camera 1111 and the second camera 1112 of FIG. 11) provided in the electronic device 1100 through the display device 1150, and receive an input of selecting one of the cameras in the list. For example, the input of selecting one of the cameras in the list may be used as the camera switching command. As an example, a voice including a phrase "switch to the wide angle camera" may be received through an input device (e.g., the input device 150 of FIG. 1) of the electronic device 1100. A result recognized by the processor 1120 through a voice recognition function for the received voice may be used as the camera switching command.

According to an embodiment, the first camera 1111 and the second camera 1112 may respectively include lenses different from each other in at least one of an angle of view or a focal length. For example, the first camera 1111 may be a wide angle camera having a wide angle lens, and the second camera 1112 may be a narrow angle camera having a narrow angle lens. As an example, the first camera 1111 may be a standard angle camera having a standard angle lens, and the second camera 1112 may be the narrow angle camera having the narrow angle lens. As an example, the first camera 1111 may be a telephoto camera having a telephoto lens, and the second camera 1112 may be the wide angle camera having the wide angle lens. For an example, a focal length of the lens disposed in the first camera 1111 may be longer than a focal length of the lens disposed in the second camera 1112. However, the disclosure is not limited thereto, and a combination of the first camera 1111 and the second camera 1112 may be formed in various embodiments.

When switching the camera selected for the image capturing in response to the camera switching command from the first camera 1111 to the second camera 1112, the electronic device 1100 may perform the auto focus function again to focus the second camera 1112 on the subject 1. In an embodiment, information about a lens location determined by the first camera 1111 to focus on the subject 1 and lens location conversion data stored in the memory 1130 may be used to perform the auto focus function rapidly and accurately. For example, first lens location data may mean data including information about a location of the lens of the first camera 1111 (e.g., an AF code of the first camera), and second lens location data may mean data including information about a location of the lens of the second camera 1112 (e.g., an AF code of the second camera). According to an embodiment, the lens location conversion data may include data in which the first lens location data and the second lens location data are mapped with each other. According to an embodiment, the lens location conversion data may include a conversion function (or a formula) indicating a relationship between the first lens location data and the second lens location data. According to an embodiment, the lens location conversion data may be stored in the memory 1130 at the time of the manufacture of the electronic device 1100. According to an embodiment, the lens location conversion data may be formed by storing a result of performing the auto focus function by switching the camera based on the camera switching command in the memory 1130.

According to an embodiment, in response to the camera switching command, the processor 1120 may obtain the second lens location data mapped to the first lens location data set in the first camera 1111 to focus on the subject 1 from the lens location conversion data. The processor 1120 may use the second lens location data as the location of the lens of the second camera 1112 for the second camera 1112 to perform the auto focus function.

In an operation in which the user uses the electronic device 1100, an operating environment or an operating state of at least one of the first camera 1111 and the second camera 1112 may change. In this case, a difference between a mapping relationship between the first lens location data and the second lens location data of the lens location conversion data stored in the memory 1130 and the operating states of the first camera 1111 and the second camera 1112 may occur. According to an embodiment, after completing the auto focus function, the processor 1120 may renew the lens location conversion data based on data corresponding to the actual operating states. For example, when the second camera 1112 is focused on the subject 1 based on the second lens location data through the second camera 1112 based on the camera switching command while the first camera 1111 is focused on the subject 1 based on the first lens location data through the first camera 1111, the processor 1120 may update the lens location conversion data stored in the memory 1130 based on the first lens location data and the second lens location data. When the first camera 1111 and the second camera 1112 have a large difference in sensor characteristics such as whether there is phase difference information, it may be effective when the second camera is focused using focus information of the first camera having the phase difference information.

According to an embodiment, when the lens location conversion data is updated based on the lens location data that is not correctly focused even after performing the auto focus function, an accuracy of the lens location conversion data may rather become low. Thus, the processor 1120 may identify a validity of at least one of the first lens location data and the second lens location data, and then update the lens location conversion data based on the data with the identified validity.

Figure 13A:
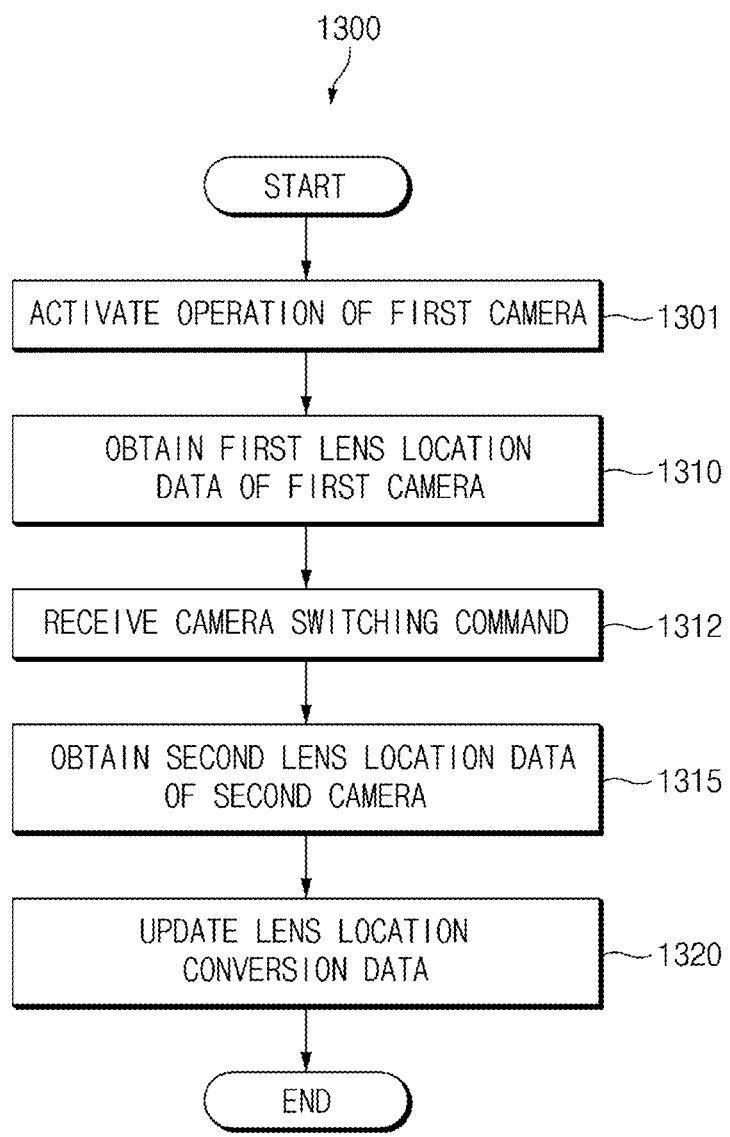
FIG. 13A is a flowchart illustrating a process, by an electronic device, of updating lens location conversion data according to an embodiment.

FIG. 13A is a flowchart 1300 illustrating a process, by the electronic device 1100, of updating lens location conversion data according to an embodiment.

According to an embodiment, the electronic device 1100 may include the first camera 1111 and the second camera 1112. When it is necessary to adjust the focuses of the first camera and the second camera together, the electronic device 1100 may perform an auto focus function for the first camera 1111 and the second camera 1112. For example, when a zoom function of the camera application is operating, an auto focus function may be performed for the wide angle lens camera and the narrow angle lens camera. As an example, an auto focus function for a plurality of lenses may be performed together even in a live bokeh mode for applying a background blur effect to a preview image.

In operation 1301, the processor 1120 of the electronic device 1100 may activate an operation of the first camera 1111.

According to an embodiment, in operation 1310, as a result of performing the auto focus function, the processor 1120 of the electronic device 1100 may obtain the first lens location data corresponding to the location of the lens of the first camera focused on the subject.

According to an embodiment, in operation 1312, the processor 1120 of the electronic device 1100 may receive the camera switching command through the input device (e.g., the input device 150 of FIG. 1). For example, when the zoom function of the camera application is operating and when the image capturing magnification is out of a specified range, the processor 1120 may process the command for controlling the zoom function as the camera switching command. As an example, because the auto focus function for the plurality of lenses is also performed during the operation in the live bokeh mode for applying the background blur effect to the preview image, the processor 1120 may receive an execution command of the live bokeh mode as the camera switching command. When the camera selected for capturing the image is switched from the first camera to the second camera, the processor 1120 received the camera switching command may perform an auto focus function for the second camera. In operation 1315, the processor 1120 may obtain second lens location data for the second camera determined as a result of performing the auto focus function for the second camera.

According to an embodiment, the processor 1120 may calculate a distribution chart for at least one of the first lens location data and the second lens location data, and perform operation 1310 and operation 1315 or perform operation 1320 when at least one of the first lens location data and the second lens location data is included in a region having a density lower than a specified value.

In operation 1320, the processor 1120 may update the lens location conversion data stored in the memory 1130 based on the first lens location data and the second lens location data. According to an embodiment, the processor 1120 may collect a plurality of pairs of the first lens location data and the second lens location data, and then replace the existing lens location data with the collected data. According to an embodiment, the processor 1120 may merge the existing lens location data and the collected data with each other.

According to an embodiment, in operation 1320, the processor 1120 may identify a validity of at least one of the first lens location data and the second lens location data, and use the data with the identified validity to update the lens location conversion data. For example, as in operations 1610, 1620, and 1630 of FIG. 16, the processor 1120 may identify the validity of the at least one of the first lens location data and the second lens location data based on the capturing environment information.

Figure 13B:
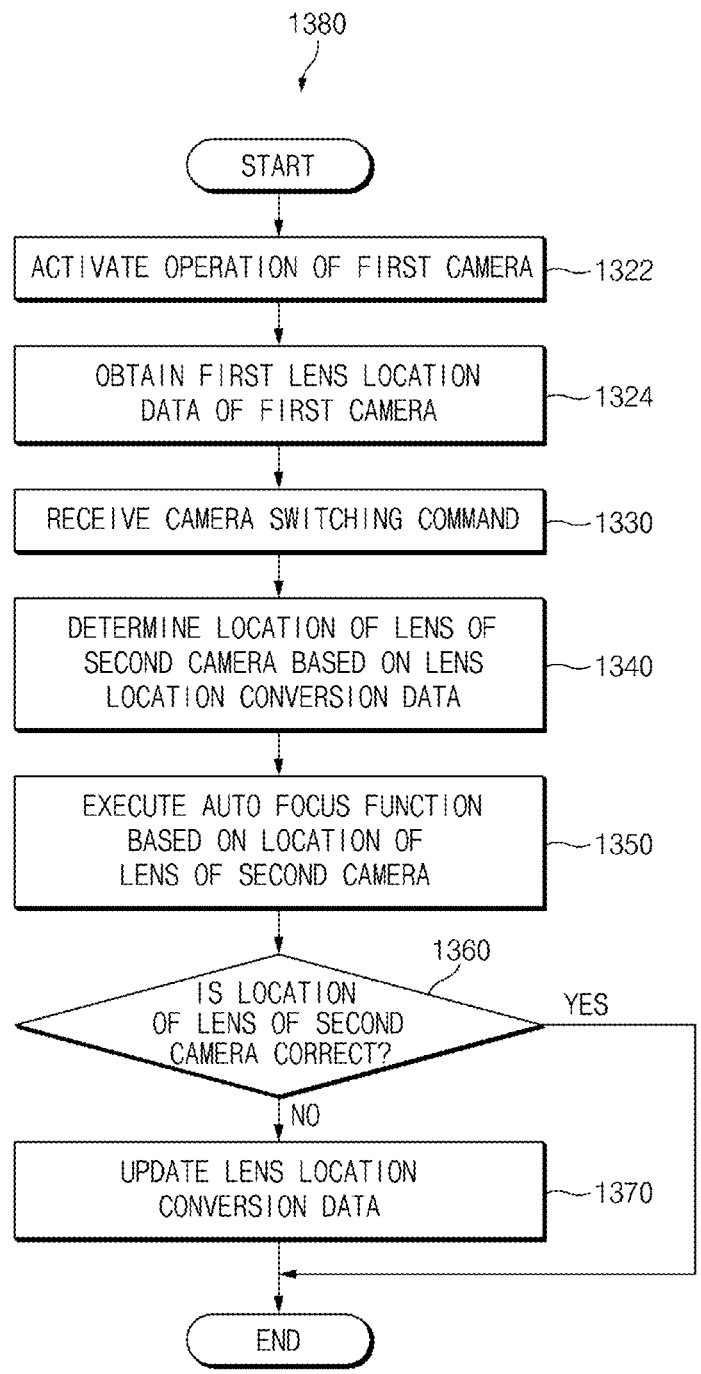
FIG. 13B is a flowchart illustrating a process, by an electronic device, of determining a lens location based on updated lens location conversion data according to an embodiment.

FIG. 13B is a flowchart 1380 illustrating a process, by an electronic device, of determining a lens location based on updated lens location conversion data according to an embodiment.

According to an embodiment, in operation 1322, the processor 1120 of the electronic device 1100 may activate the operation of the first camera similarly to operation 1301.

In operation 1324, the processor 1120 may obtain the first lens location data for the first camera similarly to operation 1310.

In operation 1330, the processor 1120 may receive the camera switching command. When the camera switching command is received, in operation 1340, the processor 1120 may determine the second lens location data indicating the lens location of the second camera based on the lens location conversion data stored in the memory 1130 and the first lens location data. In operation 1340, the processor 1120 may execute the auto focus function based on the determined lens location of the second camera. For example, referring to lens location conversion data 1400 of FIG. 14, when a first camera AF code 1410 included in the first lens location data is 180, the processor 1120 may perform the auto focus function starting with the location of the lens of the second camera having a second camera AF code 1420 of 200 as an initial location. The processor 1120 may obtain second lens location data including information about the location of the lens of the second camera determined as a result of performing operation 1350.

In operation 1360, the processor 1120 may determine whether the location of the lens of the second camera determined based on the lens location conversion data is correct. For example, when a difference between the location of the lens of the second camera determined based on the lens location conversion data and the location of the lens of the second camera determined as a result of executing the auto focus function in operation 1350 is equal to or below a specified value, the processor 1120 may determine that the location of the lens of the second camera determined based on the lens location conversion data is correct.

When the location of the lens of the second camera determined based on the lens location conversion data is not correct, in operation 1370, the processor 1120 may update the lens location data based on the first lens location data obtained in operation 1324 and the second lens location data obtained in operation 1350.

Figure 14:
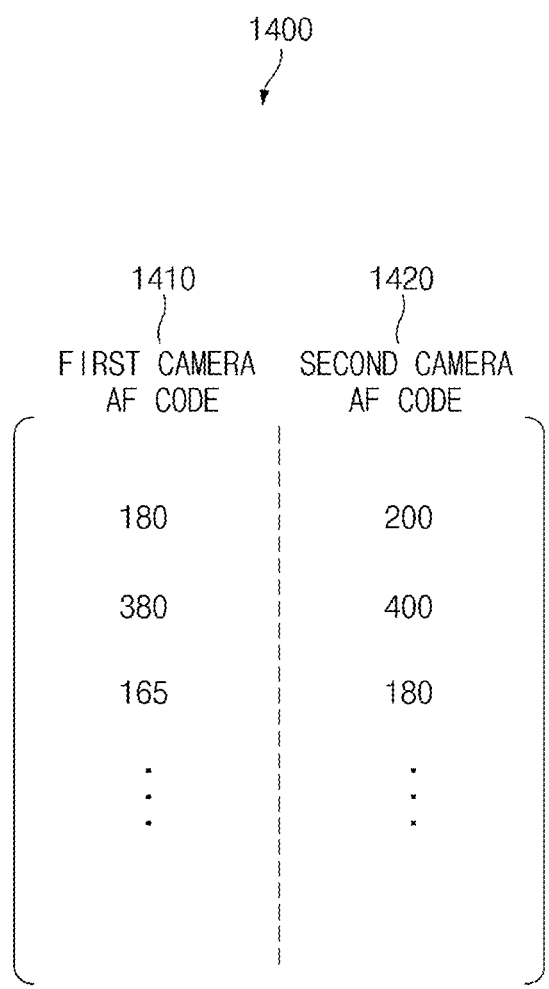
FIG. 14 is a diagram conceptually illustrating an example of lens location conversion data according to an embodiment.

FIG. 14 is a diagram conceptually illustrating an example of lens location conversion data 1400 according to an embodiment. Referring to FIG. 14, the lens location conversion data 1400 according to an embodiment may include the first camera AF code 1410 corresponding to the location of the lens of the first camera 1111 and the second camera AF code 1420 corresponding to the first camera AF code 1410. According to an embodiment, the lens location conversion data 1400 may be stored in the memory 1130 in a form of a look-up table that allows a conversion between the first camera AF code 1410 and the second camera AF code 1420. According to an embodiment, the lens location conversion data 1400 may be stored in the memory 1130 in a form of a function (or a formula) defining a relationship between the first camera AF code 1410 and the second camera AF code 1420.

Figure 15:
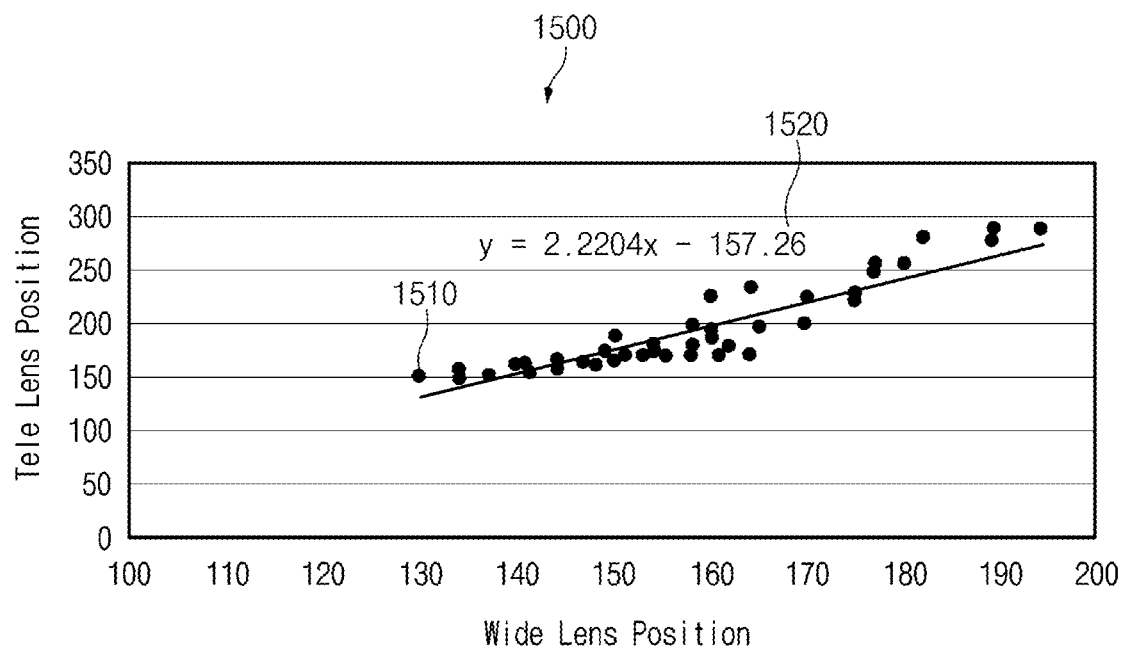
FIG. 15 illustrates a graph for describing an example of collected lens location data and a lens location conversion function according to an embodiment.

FIG. 15 illustrates a graph 1500 for describing an example of collected lens location data and a lens location conversion function according to an embodiment.

Referring to the graph 1500 of FIG. 15, the processor 1120 may collect lens location data 1510 formed of a pair of first lens location data and second lens location data.

The processor 1120 may update the lens location data based on lens location data 1510 according to an embodiment. According to an embodiment, the processor 1120 may store a set of the collected lens location data 1510 in the memory 1130 as new lens location conversion data. According to an embodiment, the processor 1120 may merge the collected lens location data 1510 with the lens location conversion data stored in the memory 1130. According to an embodiment, the processor 1120 may determine a function 1520 that defines a relationship between the first lens location data and the second lens location data from the set of the lens location data 1510. The processor 1120 may store the determined function 1520 as the lens location conversion data. As an example, the processor 1120 may modify the function that defines the relationship between the first lens location data and the second lens location data stored in the memory 1130 based on the collected lens location data 1510. However, a scheme for updating the lens location conversion data is not limited thereto.

Figure 16:
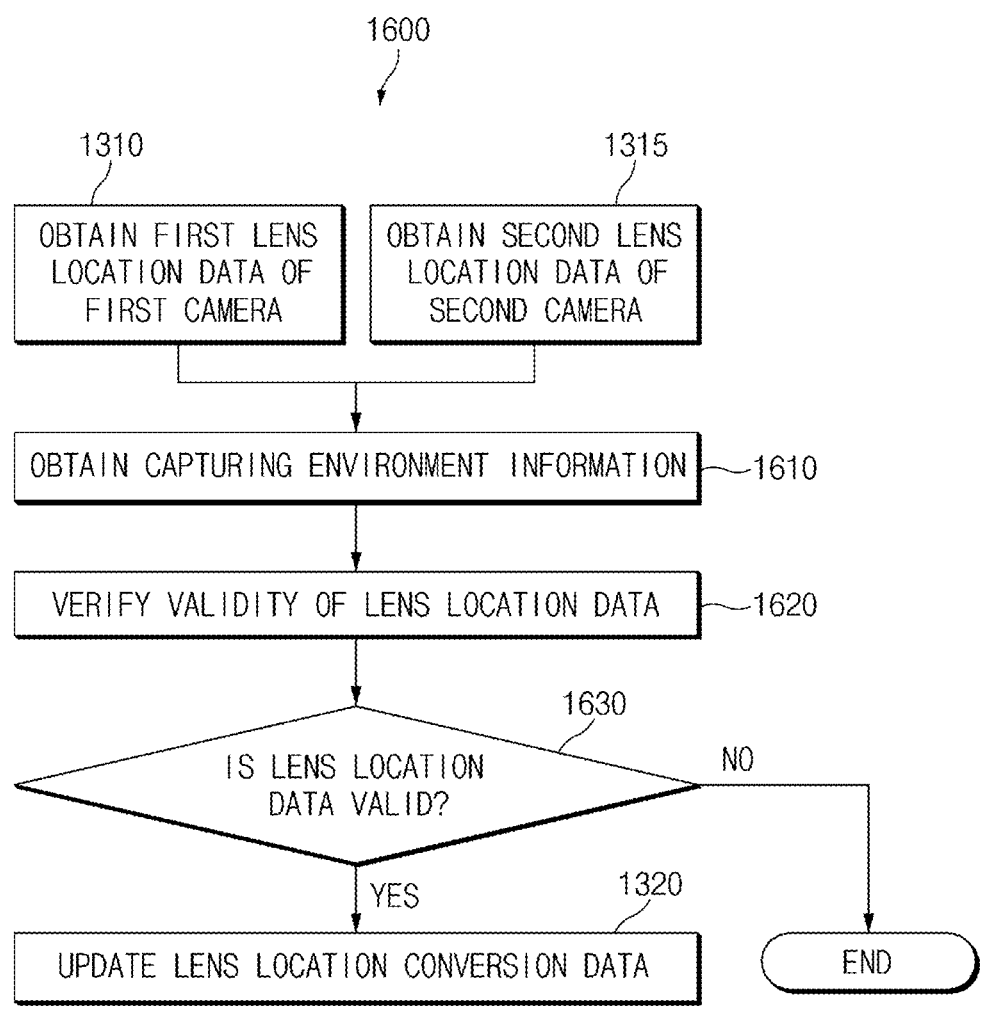
FIG. 16 is a flowchart illustrating a process of identifying lens location data according to an embodiment.

FIG. 16 is a flowchart 1600 illustrating a process of identifying lens location data according to an embodiment.

According to an embodiment, the processor 1120 of the electronic device 1100 may identify a validity of the lens location data based on capturing environment information about an environment condition associated with the image capturing (or performing the auto focus function). As an example, the processor 1120 may use lens location data with the identified validity to update the lens location conversion data.

According to an embodiment, the processor 1120 may perform operations 1310 and 1315 for obtaining the first lens location data and the second lens location data. In operation 1610, the processor 1120 may obtain capturing environment information associated with at least one of the first lens location data and the second lens location data.

According to an embodiment, the operation 1610 may include an operation, by the processor 1120, of obtaining information detected using a sensor of a sensor module (e.g., the sensor module 176 of FIG. 1) included in the electronic device 1100. For example, the processor 1120 may obtain information about motion of the electronic device 1100 from a motion sensor (e.g., a gyro sensor, an acceleration sensor, or a gravity sensor) as the capturing environment information. As an example, the processor 1120 may obtain a temperature value (e.g., an ambient temperature of the electronic device 1100 or a camera internal temperature) using a temperature sensor as the capturing environment information. According to an embodiment, information included in the capturing environment information may include other information.

According to an embodiment, operation 1610 may include an operation, by the processor 1120, of obtaining information about one or more of the first camera 1111 and the second camera 1112. For example, the processor 1120 may obtain a filter value for one or more of the first camera 1111 and the second camera 1112 as the capturing environment information. As an example, the processor 1120 may obtain information associated with an image captured by one or more of the first camera 1111 and the second camera 1112 as the capturing environment information. For example, the processor 1120 may obtain at least one of a brightness value, a signal to noise ratio (PD signal to noise ratio), or a disparity of a phase of the captured image as the capturing environment information.

In operation 1620, the processor 1120 may identify a validity of the obtained lens location data. For example, the processor 1120 may determine whether the lens location data is valid based on whether a value included in the lens location data is within a specified range. For example, when an x-axis value of a p-gyro sensor is equal to or above −5 and equal to or below 5, a y-axis value is equal to or above −4 and equal to or below 5, and a z-axis value is equal to or above −6 and equal to or below 4, the processor 1120 may determine that the lens location data is valid. As an example, when the filter value is equal to or above 3000000, the processor 1120 may determine that the lens location data is valid. As an example, when the signal-to-noise ratio is equal to or above 1000, the processor 1120 may determine that the lens location data is valid. As an example, when two or more types of the capturing environment information are included within a specified range, the processor 1120 may determine that the lens location data is valid.

According to an embodiment, a condition for identifying the validity of the lens location data may be renewed based on a result of performing the auto focus function. For example, the processor 1120 may adjust the specified range during the operation of at least one of the first camera 1111 and the second camera 1112 based on a motion value, a BV value, a filter value and a signal to noise ratio of an environment well-focused on the subject.

In operation 1630, the processor 1120 may determine whether the lens location data is valid in response to the verification result. When it is determined that the lens location data is valid, the processor 1120 may perform operation 1320 of updating the lens location conversion data.

Figure 17:
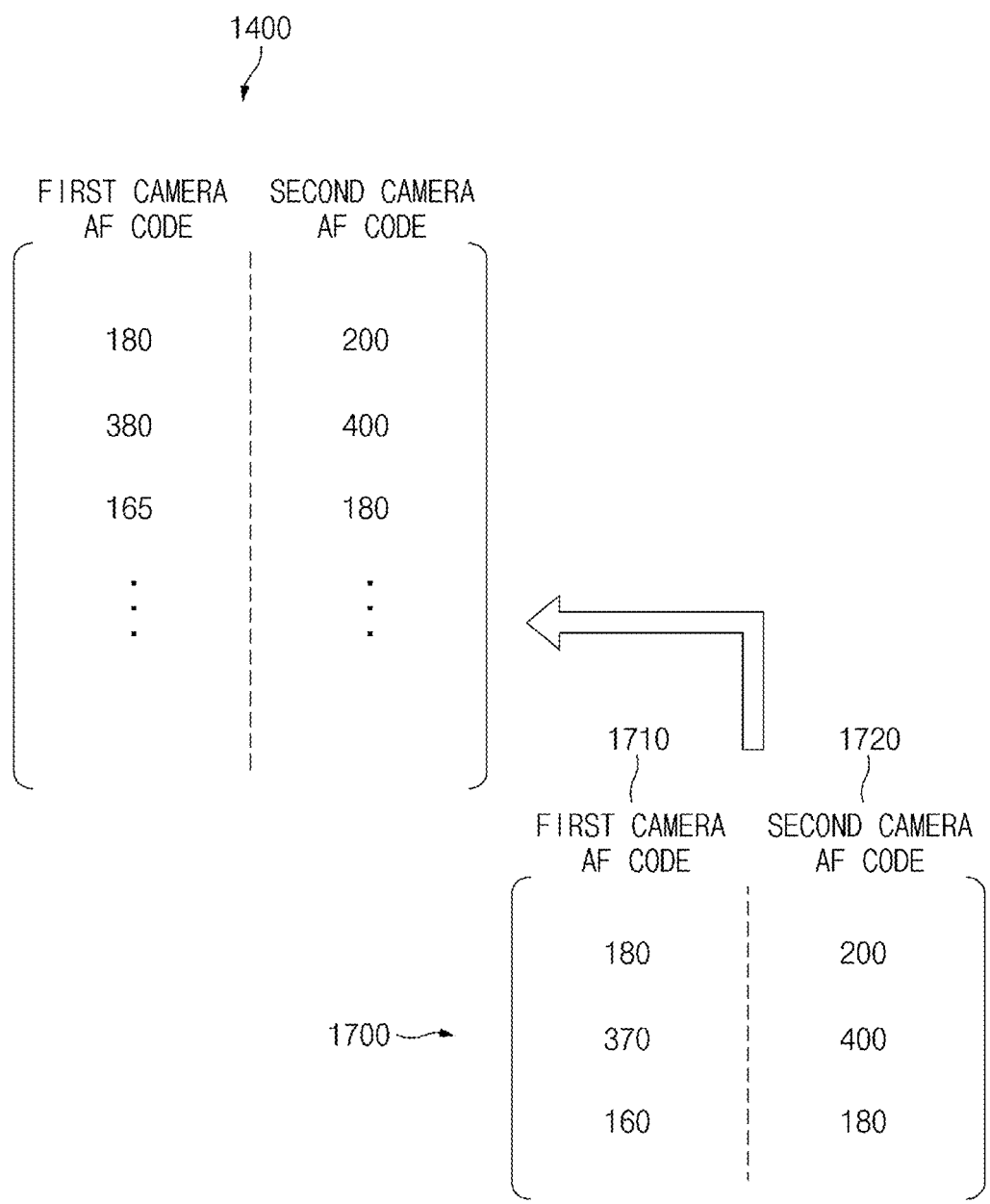
FIG. 17 illustrates a diagram for describing a method for determining, by an electronic device, lens location conversion data using learning data, according to an embodiment.

FIG. 17 is a diagram for describing a method for determining, by the electronic device 1100, the lens location conversion data 1400 using learning data 1700, according to an embodiment.

According to an embodiment, when the first lens location data for the first camera 1111 and the second lens location data for the second camera 1112 are obtained, the electronic device 1100 may map the obtained first and second lens location data with each other and accumulate and store the mapped first and second lens location data. The data that accumulates and stores the first lens location data (e.g., a first camera AF code 1710 of FIG. 17) and the second lens location data (e.g., a second camera AF code 1720 of FIG. 17) may be referred to as the learning data 1700.

According to an embodiment, the electronic device 1100 may output a user interface for determining whether to update the lens location conversion data 1400 through the display device 1150. When a user input of commanding the execution of the update is received through the user interface output through the display device 1150, the electronic device 1100 may update the lens location conversion data 1400 based on the learning data 1700 in response to the user input. The user interface may be an item indicating the update of the lens location conversion data 1400 on a menu screen or a message similar to the message 910 shown in FIG. 9.

According to an embodiment, the user interface associated with the update of the lens location conversion data 1400 may be output when an evaluation of a result of performing the auto focus function by the processor 1120 is out of a specified range. For example, when an average time required to focus using the auto focus function is greater than a specified value, or when a quality of an image captured after focusing using the auto focus function is lower than a specified value, the user interface may be output.

An electronic device (e.g., the electronic device 101 of FIG. 1 or the electronic device 200 of FIG. 2) according to an embodiment may include a camera (e.g., the camera module 180 of FIG. 1 or the camera 210 of FIG. 2), a sensor (e.g., the sensor module 176 of FIG. 1 or the sensor 240 of FIG. 2), a memory (e.g., the memory 130 of FIG. 1 or the memory 230 of FIG. 2), and a processor (e.g., the processor 120 of FIG. 1 or the processor 220 of FIG. 2) operatively connected with the camera, the sensor, and the memory. The sensor may detect a distance value, and a memory may store calibration data for correcting a lens location of the camera based on the distance value detected by the sensor. The memory may store instructions that, when executed, cause the processor to perform specified operations. The processor may determine the lens location of the camera based on the distance value of when the camera is operated when the instructions are executed. Further, the processor may obtain lens location data for the distance value and the determined lens location. Further, the processor may update the calibration data based on the lens location data, and determine the lens location of the camera based on the updated calibration data.

In this connection, the calibration data may be obtained by mapping a code corresponding to the lens location with the distance value.

Further, according to an embodiment, the processor may further obtain capturing environment information associated with a condition of an environment for the camera to capture an image, and identify a validity of the lens location data based on the capturing environment information. In updating of the calibration data, the processor may update the calibration data based on lens location data with the identified validity as the verification result of the lens location data. Further, according to an embodiment, the environment information may include at least one of motion information indicating a motion of the electronic device detected through a motion sensor, a filter value, a brightness value, a signal to noise ratio, a temperature value, and a disparity of the image captured by the camera.

Further, according to an embodiment, the processor may output a user interface for determining whether to update the calibration data on a display device (e.g., the display device 160 of FIG. 1 or the display device 250 of FIG. 2), and update the calibration data in response to a user input received using the user interface. Further, according to an embodiment, the processor may store learning data obtained by accumulating the lens location data in the memory, and then update the calibration data based on the learning data in response to the user input. The processor may delete the learning data used for the update from the memory.

Further, according to an embodiment, the sensor may include a time-of-flight (TOF) module. The processor may obtain a light level value when the camera is operated, and may not update the calibration data in a case of a low light level environment in which the light level value is lower than a specified value. Further, the processor may perform an auto focus function using distance measurement information measured using the time-of-flight module in the low light level environment.

Further, according to an embodiment, an electronic device (e.g., the electronic device 101 of FIG. 1 or the electronic device 1100 of FIG. 11) may include a first camera (e.g., the camera module 180 of FIG. 1 or the first camera 1111 of FIG. 11), a second camera (the camera module 180 of FIG. 1 or the second camera 1112 of FIG. 11), a memory (e.g., the memory 130 of FIG. 1 or the memory 1130 of FIG. 11), and a processor (e.g., the processor 120 of FIG. 1 or the processor 1120 of FIG. 11). The processor may be operatively connected with the first camera, the second camera, and the memory. The memory may store lens location conversion data mapping first lens location data for the first camera with second lens location data for the second camera.

The memory may store instructions that, when executed, cause the processor to perform specified operations. The processor may obtain the first lens location data for the first camera when the first camera is operated when the instructions are executed. The processor may obtain the second lens location data for the second camera in response to a first camera switching command (e.g., operation 1312 of FIG. 13A) for switching a selected camera from the first camera to the second camera. Further, the processor may update the lens location conversion data based on the first lens location data and the second lens location data. After the lens location conversion data is updated, the processor may determine a lens location of the second camera based on the updated lens location conversion data in response to a second camera switching command (e.g., operation 1330 of FIG. 13B) for switching the selected camera from the first camera to the second camera.

According to an embodiment, environment information may include at least one of motion information indicating a motion of the electronic device detected through a motion sensor, a filter value, a brightness value, a signal to noise ratio, a temperature value, and a disparity.

According to an embodiment, the processor may calculate a distribution chart associated with at least one of the first lens location data and the second lens location data. The processor may update the lens location conversion data when the at least one of the first lens location data and the second lens location data is included in a region in the distribution chart having a low density of data.

According to an embodiment, the electronic device may further include a display device (e.g., the display device 160 of FIG. 1 or the display device 1150 of FIG. 11). The processor may output a user interface for determining whether to update the lens location conversion data on the display device, and update the lens location conversion data in response to a user input received using the user interface.

According to an embodiment, the processor may accumulate a pair of data obtained by mapping the first lens location data and the second lens location data with each other and store the pair of data in the memory as learning data when the lens location data is valid. Further, the processor may update the lens location conversion data based on the learning data in response to the user input received through the user interface. Further, the processor may delete the learning data used for the update from the memory.

According to an embodiment, the first camera and the second camera may respectively include lenses different from each other in at least one of a focal length and an angle of view.

According to an embodiment, the processor may determine a lens location conversion function based on the lens location conversion data. Further, the processor may input a lens location of the first camera into the determined lens location conversion function in response to the second camera switching command (e.g., the operation 1330 of FIG. 13B). The processor may determine a lens location of the second camera based on a value returned by the lens location conversion function in response to the input lens location of the first camera.

According to an embodiment, a method for determining a lens location by an electronic device (e.g., the electronic device 100 of FIG. 1 or the electronic device 200 of FIG. 2) having a camera (e.g., the camera module 180 of FIG. 1 or the camera 210 of FIG. 2), the electronic device may obtain a distance value using a distance sensor (e.g., the sensor module 176 of FIG. 1 or the sensor 240 of FIG. 2). Further, the electronic device may determine a lens location based on the distance value when the camera is operated. Further, a processor may update calibration data based on lens location data including information about the distance value and the determined lens location. Thereafter, the processor may determine the lens location of the camera based on the updated calibration data.

According to an embodiment, the electronic device may obtain capturing environment information of the camera. Further, the updating of the calibration data may include identifying a validity of the lens location data based on the capturing environment information. Further, the updating of the calibration data may include updating the calibration data based on the lens location data having the identified validity as a result of identifying the validity of the lens location data.

According to an embodiment, the electronic device may further perform accumulating and storing the lens location data as learning data. Further, the updating of the calibration data may further include receiving a user input associated with the update of the calibration data, and updating the calibration data based on the learning data in response to the user input.

In an embodiment, according to a method for determining a lens location by an electronic device (e.g., the electronic device 101 of FIG. 1 or the electronic device 1100 of FIG. 11) having a first camera (e.g., the camera module 180 of FIG. 1 or the first camera 1111 of FIG. 11) and a second camera (e.g., the camera module 180 of FIG. 1 or the second camera 1112 of FIG. 11), the electronic device may obtain first lens location data for the first camera when the first camera is operated. A processor may perform obtaining second lens location data for the second camera by executing an auto focus function in response to a first camera switching command (e.g., the operation 1312 of FIG. 13A) for switching a selected camera from the first camera to the second camera. Further, the electronic device may update lens location conversion data mapping a first lens location for the first camera and a second lens location for the second camera with each other based on the first lens location data and the second lens location data. Thereafter, the electronic device may determine a lens location of the second camera based on the updated lens location conversion data in response to a second camera switching command (e.g., the operation 1330 of FIG. 13B) for switching the selected camera from the first camera to the second camera.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to the embodiments disclosed in the disclosure, the accuracy of the lens location matching the distance information may be improved based on the usage environment of the electronic device.

Further, according to the embodiments disclosed in the disclosure, when the camera of the electronic device having the plurality of cameras is switched, the location of the lens for find the focus may be determined more rapidly.

In addition, various effects, directly or indirectly understood through this document, may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a camera;
a sensor for detecting a distance value relative to an object;
a memory for storing calibration data for correcting a lens location of the camera based on the distance value detected by the sensor; and
a processor operatively connected with the camera, the sensor, and the memory,
wherein the memory stores instructions that, when executed, cause the processor to:
determine the lens location of the camera based on the distance value while the camera is operated;
obtain lens location data for the distance value and the determined lens location;
obtain capturing environment information associated with a condition of an environment for the camera to capture an image;
identify a validity of the lens location data based on the capturing environment information;
update the calibration data based on the lens location data with the identified validity; and
determine the lens location of the camera based on the updated calibration data.

2. The electronic device of claim 1, wherein the calibration data is obtained by mapping a code corresponding to the lens location with the distance value.

3. The electronic device of claim 1, wherein the environment information includes at least one of motion information indicating a motion of the electronic device detected through a motion sensor, a filter value, a brightness value, a signal to noise ratio, a temperature value, or a disparity of the image captured by the camera.

4. The electronic device of claim 1, wherein the instructions further cause the processor to:
calculate a distribution chart associated with a distance value of the obtained lens location data; and
update the calibration data based on the distance value corresponding to the obtained lens location data being included in a region in the distribution chart having a density of data below a specified value.

5. The electronic device of claim 1, wherein the electronic device further includes a display device,
wherein the instructions further cause the processor to:
output a user interface for determining whether to update the calibration data on the display device; and update the calibration data in response to a user input received using the user interface.

6. The electronic device of claim 5, wherein the instructions further cause the processor to:
store learning data obtained by accumulating the lens location data in the memory;
update the calibration data based on the learning data in response to the user input; and
delete the learning data from the memory.

7. The electronic device of claim 1, wherein the sensor includes a time-of-flight (TOF) module,
wherein the instructions cause the processor to:
obtain a light level value based on the camera being operated; and
perform an auto focus function using distance measurement information measured using the TOF module without updating the calibration data based on the light level value being lower than a specified value.

8. An electronic device comprising:
a first camera;
a second camera;
a memory for storing lens location conversion data mapping first lens location data for the first camera with second lens location data for the second camera; and
a processor operatively connected with the first camera, the second camera, and the memory,
wherein the memory stores instructions that, when executed, cause the processor to:
obtain the first lens location data for the first camera while the first camera is operated;
obtain the second lens location data for the second camera in response to a first command to switch from the first camera to the second camera;
obtain capturing environment information associated with an environment condition, wherein at least one of the first camera and the second camera captures an image in the environment condition;
identify a validity of the first lens location data and the second lens location data based on the capturing environment information; and
update the lens location conversion data based on the first lens location data and the second lens location data having the identified validity; and
determine a lens location of the second camera based on the updated lens location conversion data in response to a second command to switch from the first camera to the second camera.

9. The electronic device of claim 8, wherein the environment information includes at least one of motion information indicating a motion of the electronic device detected through a motion sensor, a filter value, a brightness value, a signal to noise ratio, a temperature value, or a disparity.

10. The electronic device of claim 8, wherein the instructions further cause the processor to:
calculate a distribution chart associated with at least one of the obtained first lens location data and second lens location data; and
update the lens location conversion data based on the at least one of the obtained first lens location data and second lens location data being included in a region in the distribution chart having a low density of data.

11. The electronic device of claim 8, further comprising a display device,
wherein the instructions further cause the processor to:
output a user interface for determining whether to update the lens location conversion data on the display device; and
update the lens location conversion data in response to a user input received using the user interface.

12. The electronic device of claim 11, wherein the instructions further cause the processor to:
store learning data obtained by accumulating a pair of data obtained by mapping the first lens location data and the second lens location data with each other in the memory based on the lens location data being valid; and
update the lens location conversion data based on the learning data in response to the user input and delete the learning data from the memory.

13. The electronic device of claim 8, wherein the first camera and the second camera respectively include lenses different from each other in at least one of a focal length or an angle of view.

14. The electronic device of claim 8, wherein the instructions further cause the processor to:
determine a lens location conversion function based on the lens location conversion data;
input a lens location of the first camera into the determined lens location conversion function; and
determine a lens location of the second camera based on a value returned by the lens location conversion function in response to the second camera switching command.

15. A method for determining a lens location by an electronic device having a camera, the method comprising:
obtaining a distance value using a sensor;
determining a lens location based on the distance value while the camera is operated;
obtaining lens location data for the distance value and the determined lens location;
obtaining capturing environment information associated with a condition of an environment for the camera to capture an image;
identifying a validity of the lens location data based on the capturing environment information;
updating calibration data based on lens location data with the identified validity, the lens location data including information about the distance value and the determined lens location; and
determining the lens location of the camera based on the updated calibration data.

16. The method of claim 15, wherein the updating of the calibration data further includes:
accumulating and storing the lens location data as learning data;
receiving a user input associated with the update of the calibration data; and
updating the calibration data based on the learning data in response to the user input.

17. A method for determining a lens location by an electronic device having a first camera and a second camera, the method comprising:
storing lens location conversion data mapping first lens location data for the first camera with second lens location data for the second camera;
obtaining first lens location data for the first camera while the first camera is operated;
obtaining second lens location data for the second camera in response to a first command to switch from the first camera to the second camera;
obtaining capturing environment information associated with an environment condition, wherein at least one of the first camera and the second camera captures an image in the environment condition;

identifying a validity of the first lens location data and the second lens location data based on the capturing environment information; and updating the lens location conversion data based on the first lens location data and the second lens location data having the identified validity; and determining a lens location of the second camera based on the updated lens location conversion data in response to a second command to switch from the first camera to the second camera.

* * * * *